(12) United States Patent
Eguchi

(10) Patent No.: US 8,154,806 B2
(45) Date of Patent: Apr. 10, 2012

(54) ZOOM LENS SYSTEM AND CAMERA INCLUDING THE SAME

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 12/475,320

(22) Filed: May 29, 2009

(65) Prior Publication Data

US 2009/0295982 A1 Dec. 3, 2009

(30) Foreign Application Priority Data

Jun. 3, 2008 (JP) .................................. 2008-145621

(51) Int. Cl.
*G02B 15/14* (2006.01)
(52) U.S. Cl. ......... 359/689; 359/683; 359/687; 359/690
(58) Field of Classification Search .......... 359/687–690, 359/683; 348/240.99–240.3
See application file for complete search history.

(56) References Cited

U.S. PATENT DOCUMENTS

| 7,061,686 | B2* | 6/2006 | Ohtake | 359/687 |
| 7,692,872 | B2* | 4/2010 | Hankawa et al. | 359/690 |
| 2009/0109548 | A1* | 4/2009 | Kimura | 359/690 |

FOREIGN PATENT DOCUMENTS

| JP | 06-160712 A | 6/1994 |
| JP | 06-337375 A | 12/1994 |
| JP | 2005-338740 A | 12/2005 |
| JP | 2006-084887 A | 3/2006 |
| JP | 2007-171371 A | 7/2007 |
| JP | 2007-212537 A | 8/2007 |

OTHER PUBLICATIONS

Geary, Joseph M. Introduction to Lens Design: with Practical Zemax Examples. Richmond, VA: Willmann-Bell, 2002. 23. Print.*

* cited by examiner

*Primary Examiner* — Ricky Mack
*Assistant Examiner* — Zachary Wilkes
(74) *Attorney, Agent, or Firm* — Canon USA Inc IP Division

(57) ABSTRACT

Disclosed is a zoom lens system including a first lens unit having a positive optical power, a second lens unit having a negative optical power, and a rear unit including at least one lens unit, which are disposed in the stated order from an object side to an image side. At least two lens units move for zooming so that a distance between adjacent lens units is changed. In this zoom lens system, the first lens unit includes a composite optical element in which a first optical element having a positive optical power and a second optical element having a negative optical power are cemented to each other. Refractive indexes and Abbe numbers of materials of the first optical element and the second optical element are set appropriately so that high optical performance is realized.

8 Claims, 9 Drawing Sheets

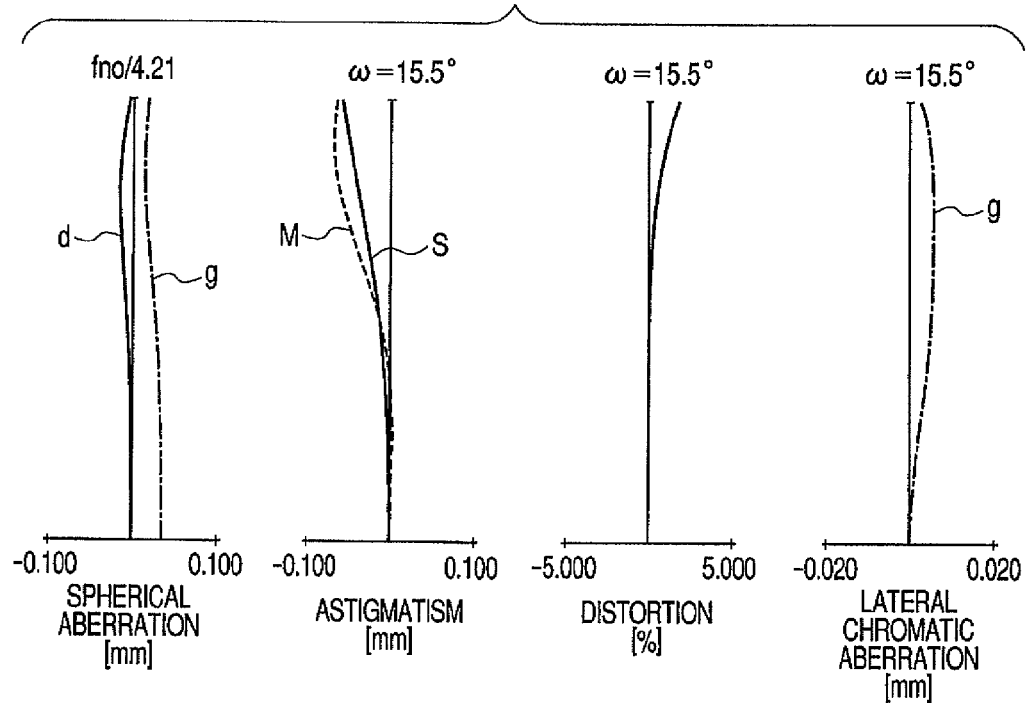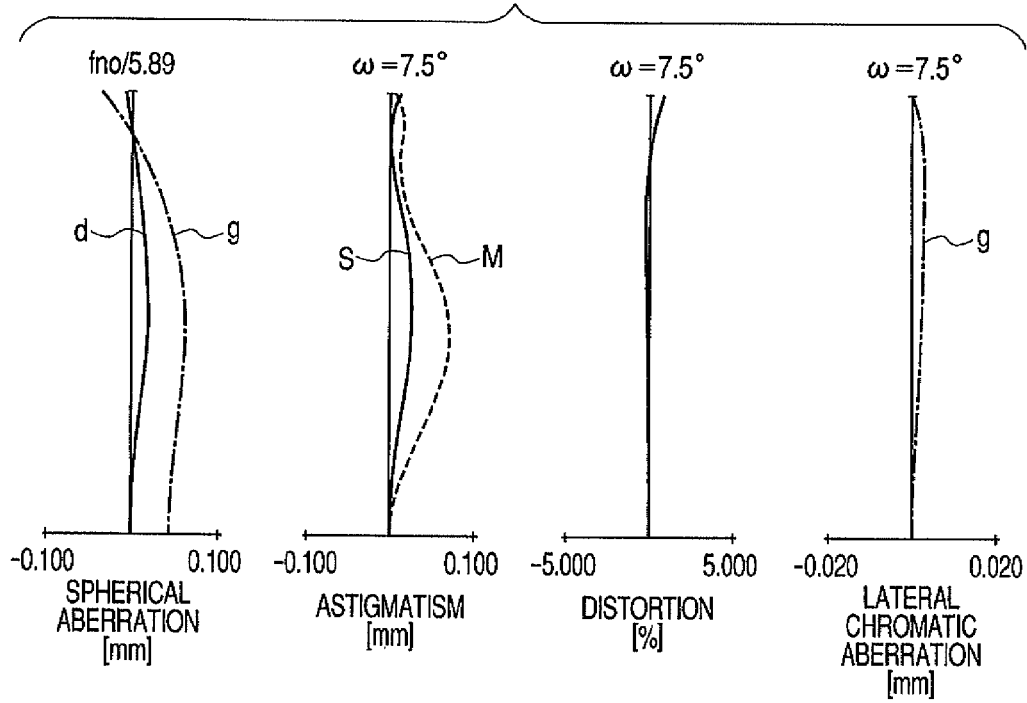

ZOOM LENS SYSTEM AND CAMERA INCLUDING THE SAME

BACKGROUND OF THE INVENTION

1. Field of the Invention

The present invention relates to a zoom lens system and a camera including the same.

2. Description of the Related Art

In recent years, a camera such as a video camera, a digital still camera, a broadcasting camera, and a monitoring camera which use a solid-state image pickup element, or a camera using a silver-halide film is improved in function, and the entire camera is reduced in size.

A zoom lens system which has a short entire lens length, is compact, has high zoom ratio, and has high resolution is demanded for an imaging optical system used for the camera.

As one of the zoom lens system that can meet the requirements, there is known a positive-lead zoom lens system in which a lens unit having a positive refractive power, a lens unit having a negative refractive power, and subsequently a rear unit including at least one lens unit are disposed in the stated order from an object side to an image side (Japanese Patent Application Laid-Open No. 2007-212537, Japanese Patent Application Laid-Open No. 2005-338740 (corresponding to U.S. Pat. No. 7,283,310), Japanese Patent Application Laid-Open No. 2007-171371 (corresponding to U.S. Pat. No. 7,319,562), Japanese Patent Application Laid-Open No. H06-160712, and Japanese Patent Application Laid-Open No. H06-337375 (corresponding to U.S. Pat. No. 5,642,224)).

In addition, a translucent ceramic material has been developed recently, and there is known a shooting optical system using the translucent ceramic material as an optical material. The translucent ceramic material has a refractive index larger than that of optical glass and is superior in hardness and strength. There is known a camera that utilizes this characteristic so as to achieve a thin profile of the entire lens system (Japanese Patent Application Laid-Open No. 2006-084887 (corresponding to U.S. Pat. No. 7,407,334)).

In general, a zoom lens system can be made smaller in size by enhancing refractive powers of lens units constituting the zoom lens system while reducing the number of lens elements.

However, the zoom lens system having such the structure may increase a lens thickness to cause insufficient effects of shortening the lens system and difficulty in compensating for various aberrations.

Therefore, in order to achieve a high zoom ratio and a small size of the entire lens system, it is necessary to set appropriately a zoom type, refractive powers of lens units, a lens structure of each lens unit, and the like.

In addition, optical glass usually has characteristics that when a refractive index is increased, an Abbe number is decreased while dispersion is increased.

In contrast, there is known a ceramic material having the same Abbe number as that of optical glass and a higher refractive index than that of optical glass.

If the ceramic material having such characteristics is used as an optical material, it is advantageous for compensating for aberration and achieving a small size of the entire optical system.

However, if the lens element made of a ceramic material is simply used for a zoom lens system, it is difficult to achieve a small size of the entire system and to obtain high optical performance over the entire zoom range.

In particular, as to the positive-lead zoom lens system described above, it is important to set appropriately a lens structure of a first lens unit for achieving a small effective diameter of the first lens unit, a small size of the entire system, and a high zoom ratio. For instance, it is important to select an appropriate material for the lens element of the first lens unit and to constitute the first lens unit with a minimum number of lens elements.

In the positive-lead zoom lens system, if the lens structure of the first lens unit is inappropriate, it is very difficult to achieve a small size of the entire system and to obtain high optical performance over the entire zoom range.

SUMMARY OF THE INVENTION

It is an object of the present invention to provide a small zoom lens system having a high zoom ratio and high optical performance over an entire zoom range, and a camera including the same.

An exemplary zoom lens system according to the present invention includes: a first lens unit having a positive optical power; a second lens unit having a negative optical power; and a rear unit including at least one lens unit in the stated order from an object side to an image side. When zooming is performed, at least two of the first lens unit, the second lens unit, and at least one lens unit of the rear unit move so that a distance between adjacent lens units is changed. In such the zoom lens system, the first lens unit includes a composite optical element in which a first optical element having a positive optical power and a second optical element having a negative optical power are cemented to each other. Refractive indexes and Abbe numbers of materials of the first optical element and the second optical element are set appropriately.

Further features of the present invention become apparent from the following description of exemplary embodiments with reference to the attached drawings.

BRIEF DESCRIPTION OF THE DRAWINGS

FIG. 3 is a diagram illustrating various aberrations of the zoom lens system of the first embodiment at a middle point.

FIG. 4 is a diagram illustrating various aberrations of the zoom lens system of the first embodiment at a telephoto end.

DESCRIPTION OF THE EMBODIMENTS

Hereinafter, embodiments of a zoom lens system according to the present invention and a camera including the same are described.

The zoom lens system of each embodiment includes a first lens unit having a positive refractive power (that is, "optical power" which is equal to an inverse number of a focal length), a second lens unit having a negative refractive power, and a rear unit having one or more lens units, which are disposed in the stated order from an object side to an image side.

In this zoom lens system, when zooming is performed, at least two lens units are moved so that a distance between adjacent lens units is changed.

Figure 1:
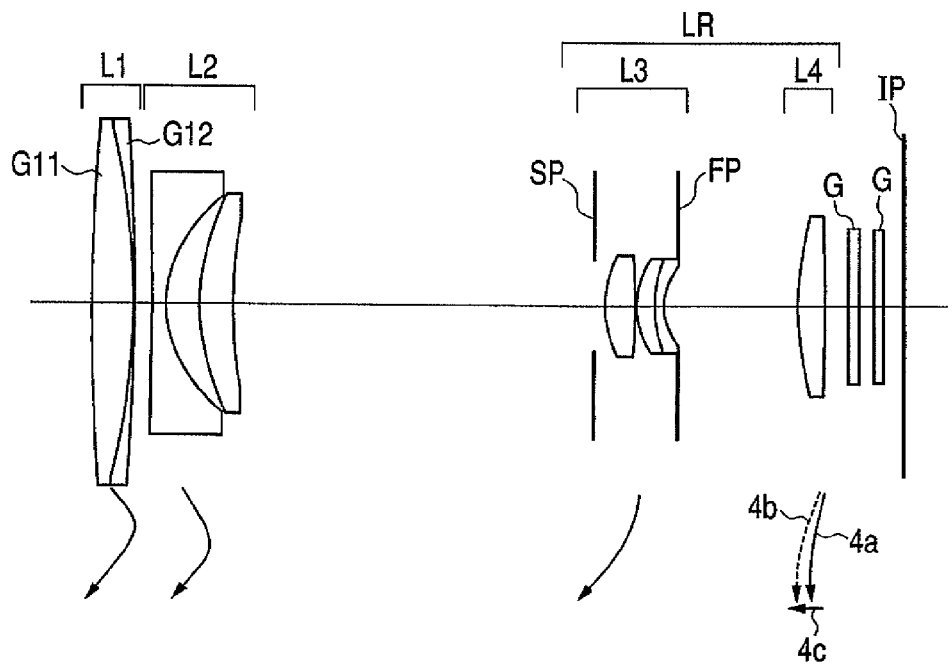
FIG. 1 is a lens cross section of a zoom lens system according to a first embodiment at a wide-angle end.
Figure 2:
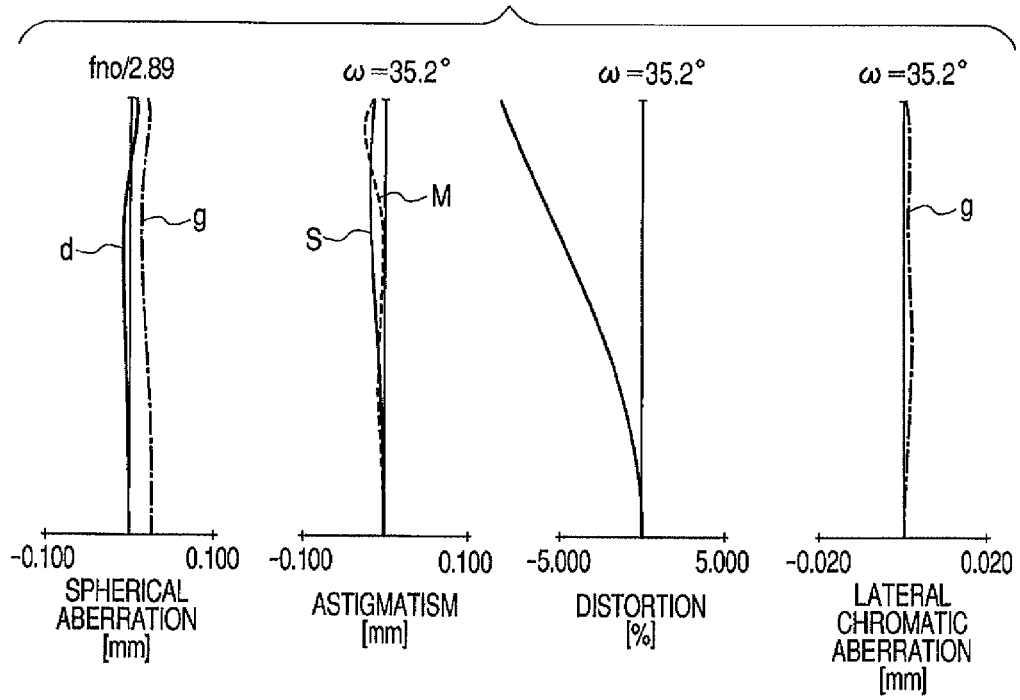
FIG. 2 is a diagram illustrating various aberrations of the zoom lens system of the first embodiment at the wide-angle end.

FIG. 1 is a lens cross section of the zoom lens system according to a first embodiment of the present invention at a wide-angle end (end of a short focal length). FIGS. 2 to 4 are diagrams illustrating aberrations of the zoom lens system of the first embodiment at the wide-angle end, at a middle zoom position, and at a telephoto end (end of a long focal length), respectively.

Figure 5:
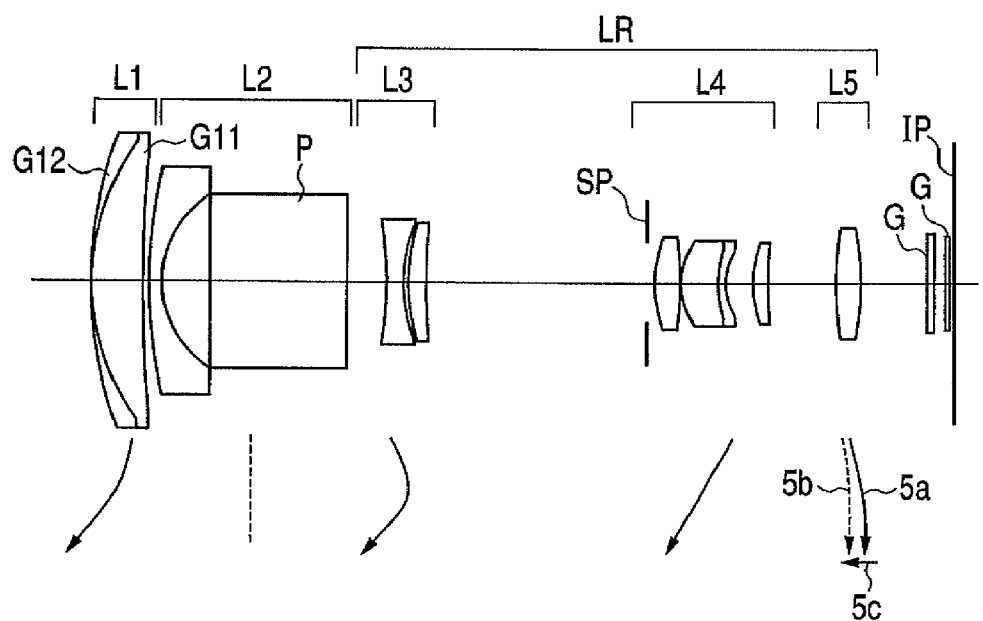
FIG. 5 is a lens cross section of a zoom lens system of a second embodiment at a wide-angle end.
Figure 6:
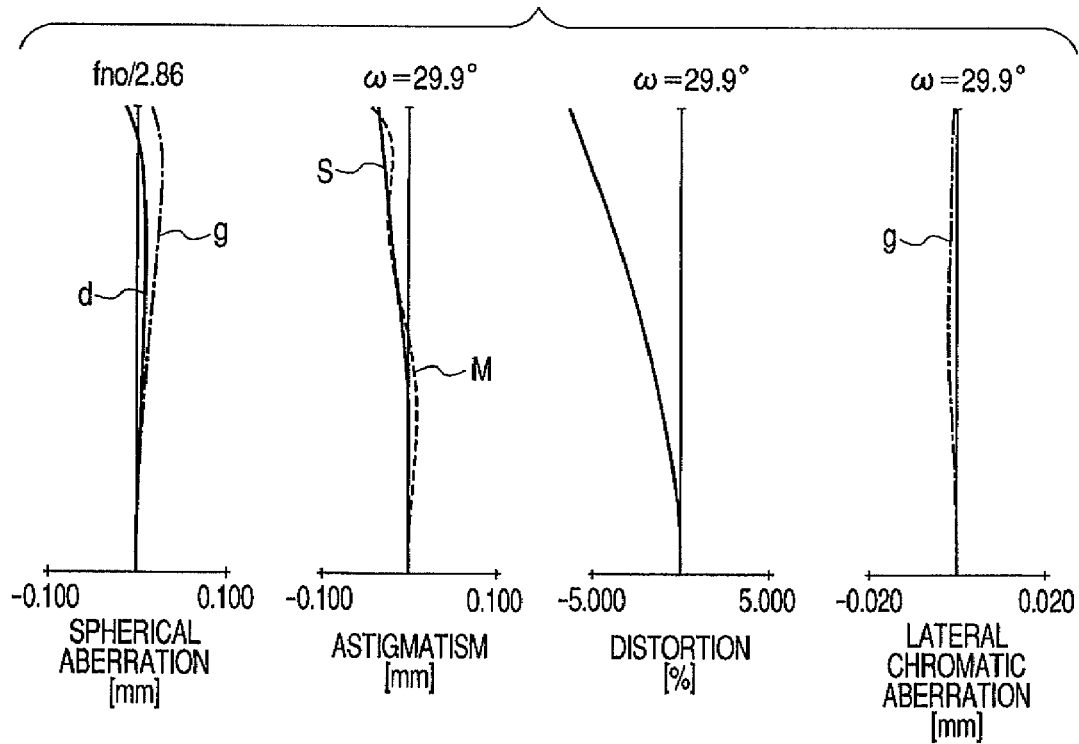
FIG. 6 is a diagram illustrating various aberrations of the zoom lens system of the second embodiment at the wide-angle end.
Figure 7:
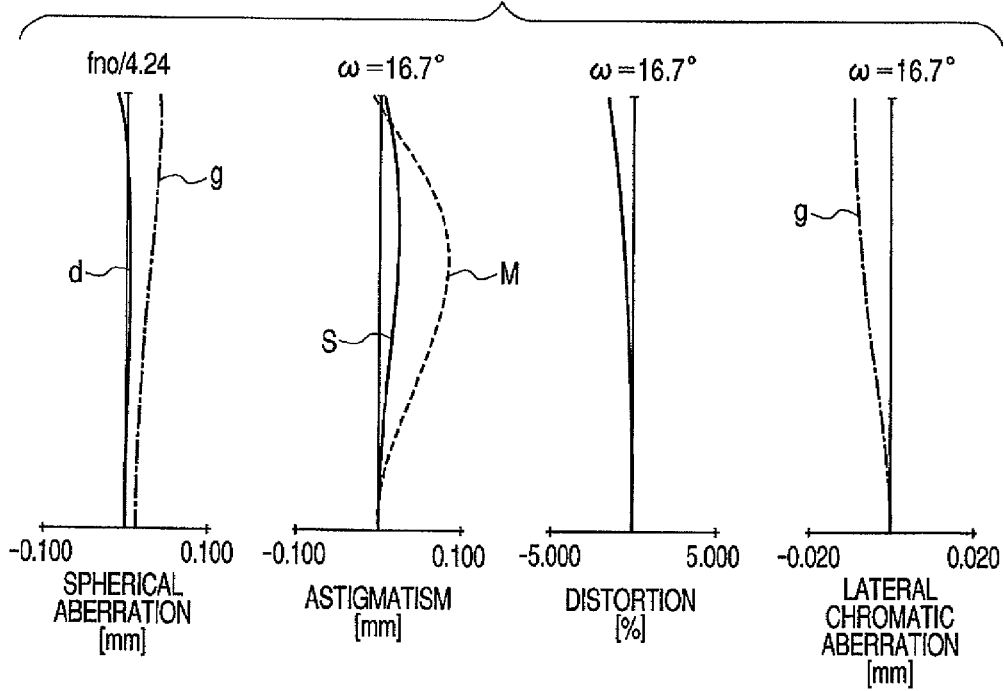
FIG. 7 is a diagram illustrating various aberrations of the zoom lens system of the second embodiment at a middle point.
Figure 8:
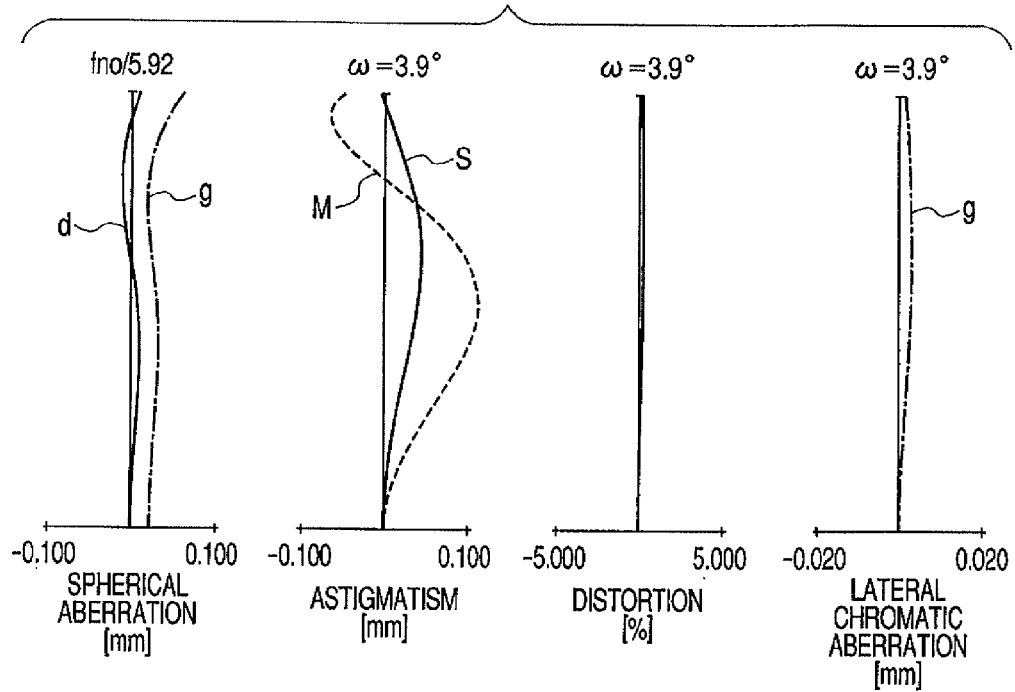
FIG. 8 is a diagram illustrating various aberrations of the zoom lens system of the second embodiment at a telephoto end.

FIG. 5 is a lens cross section of the zoom lens system according to a second embodiment of the present invention at the wide-angle end. FIGS. 6, 7 and 8 are aberration diagrams of the zoom lens system of the second embodiment at the wide-angle end, at the middle zoom position, and at the telephoto end, respectively.

Figure 9:
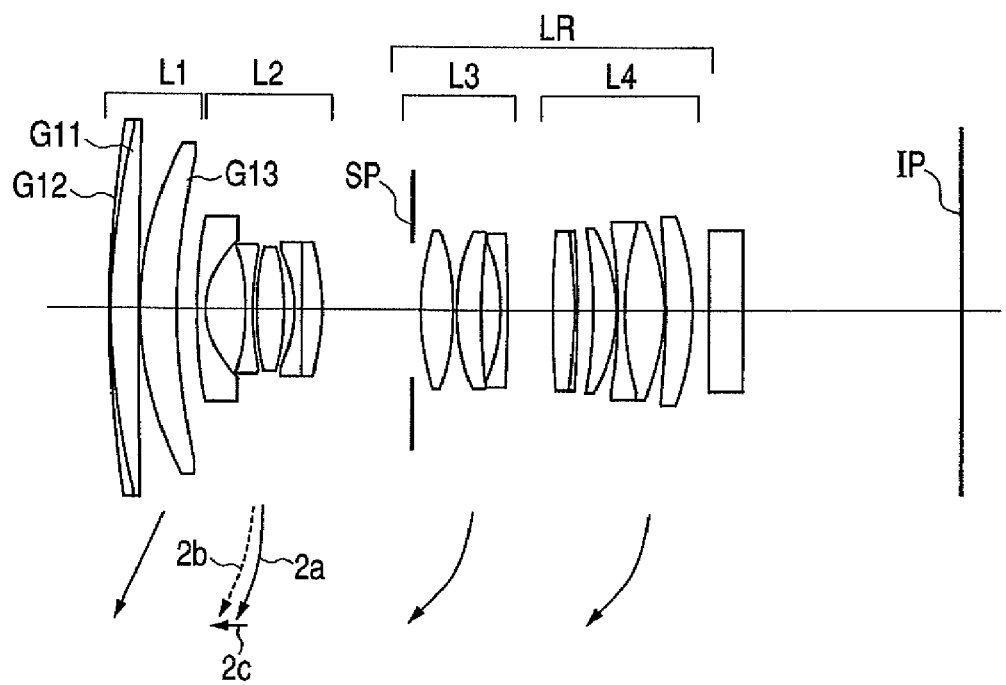
FIG. 9 is a lens cross section of a zoom lens system of a third embodiment at a wide-angle end.
Figure 10:
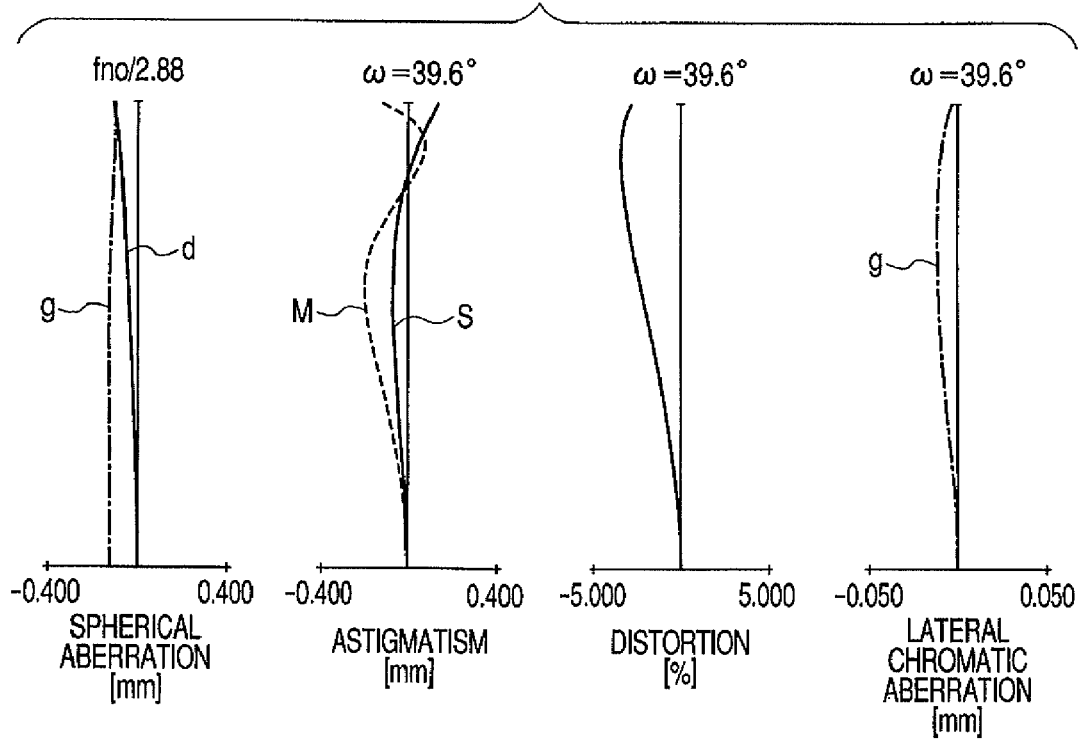
FIG. 10 is a diagram illustrating various aberrations of the zoom lens system of the third embodiment at the wide-angle end.
Figure 11:
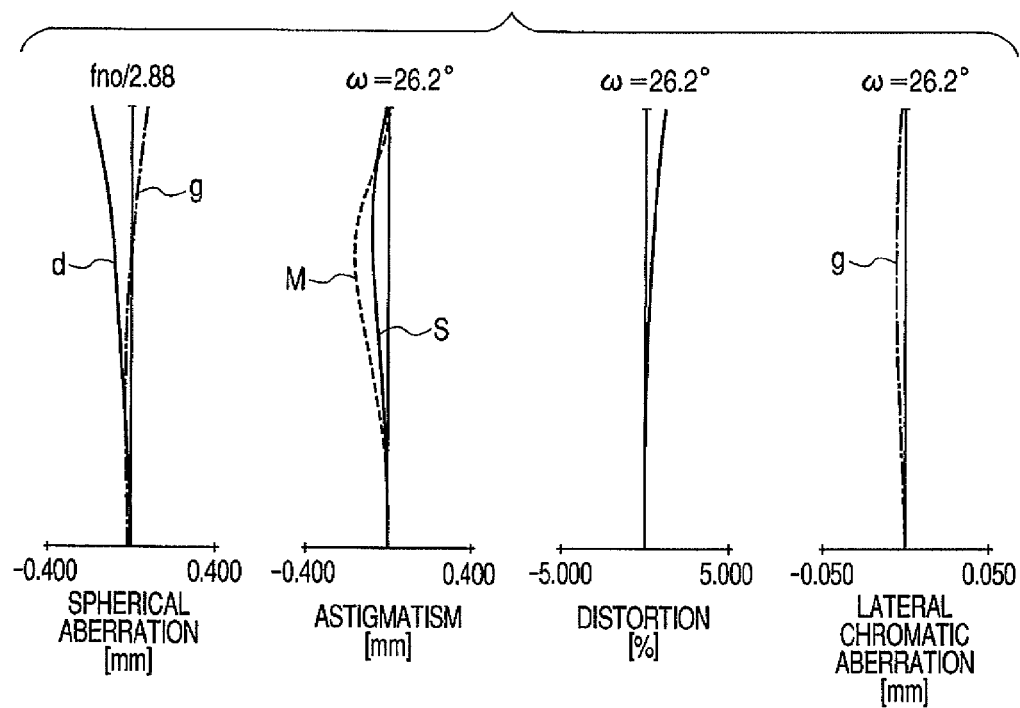
FIG. 11 is a diagram illustrating various aberrations of the zoom lens system of the third embodiment at a middle point.
Figure 12:
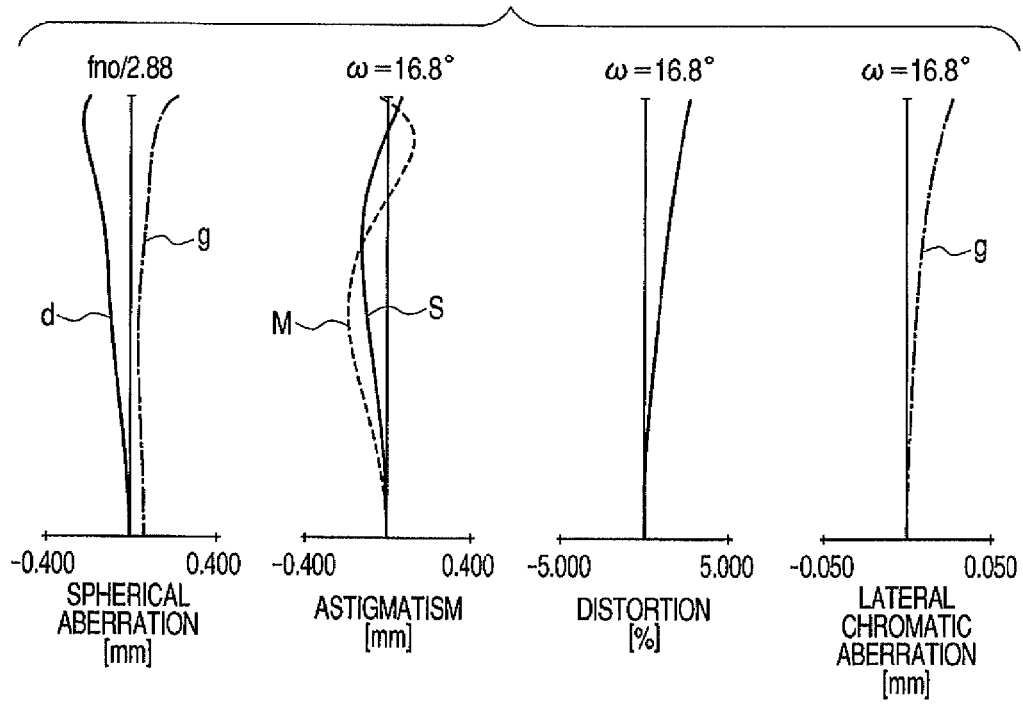
FIG. 12 is a diagram illustrating various aberrations of the zoom lens system of the third embodiment at a telephoto end.

FIG. 9 is a lens cross section of the zoom lens system according to a third embodiment of the present invention at the wide-angle end. FIGS. 10, 11 and 12 are diagrams illustrating various aberrations of the zoom lens system of the third embodiment at the wide-angle end, at the middle zoom position, and at the telephoto end, respectively.

Figure 13:
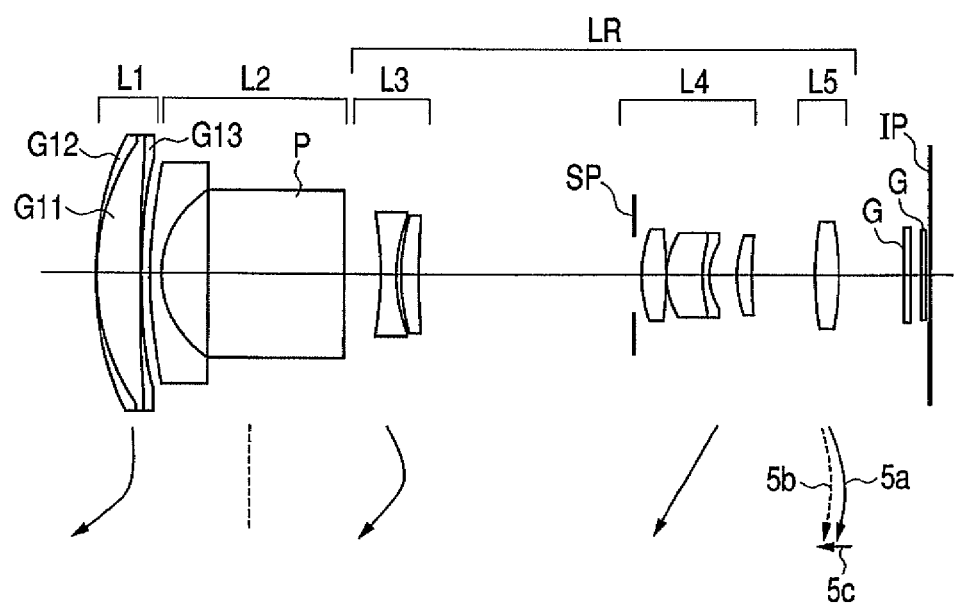
FIG. 13 is a lens cross section of a zoom lens system of a fourth embodiment at a wide-angle end.
Figure 14:
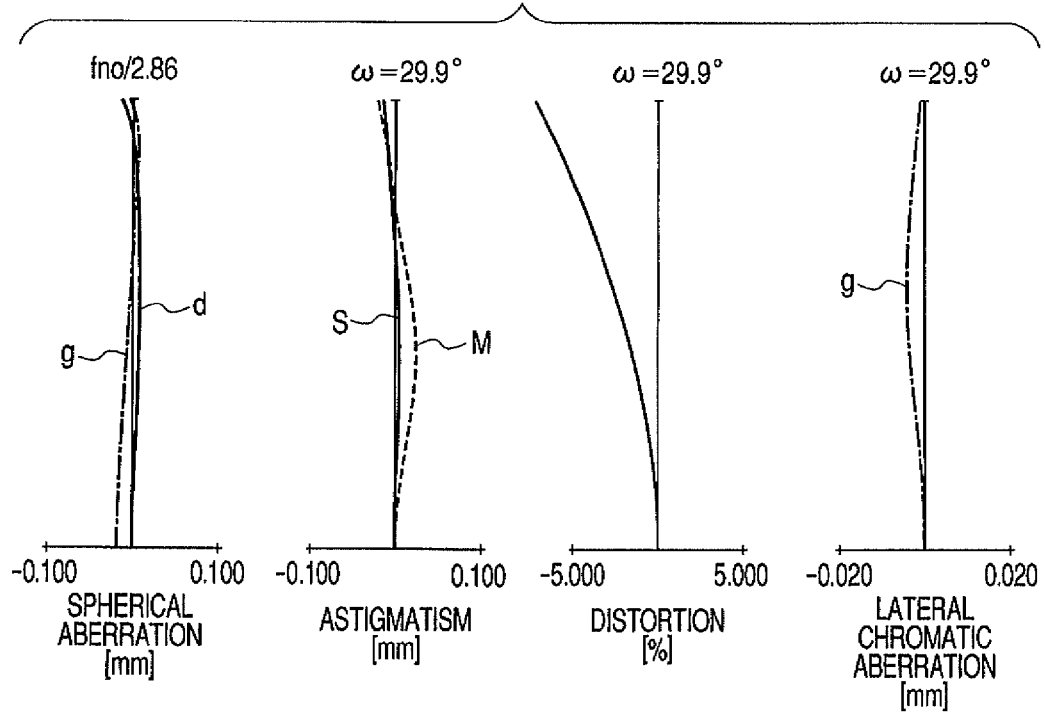
FIG. 14 is a diagram illustrating various aberrations of the zoom lens system of the fourth embodiment at the wide-angle end.
Figure 15:
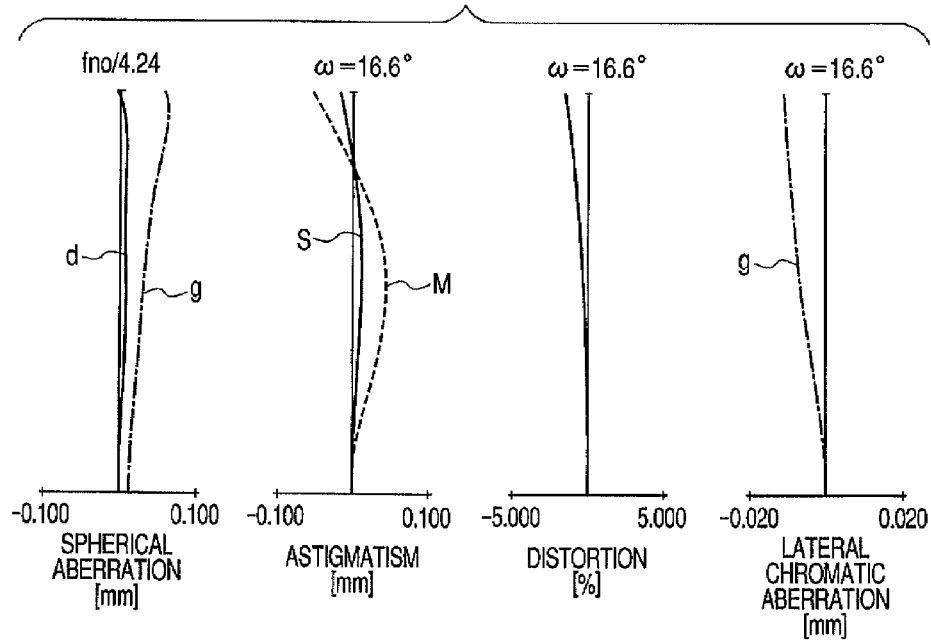
FIG. 15 is a diagram illustrating various aberrations of the zoom lens system of the fourth embodiment at a middle point.
Figure 16:
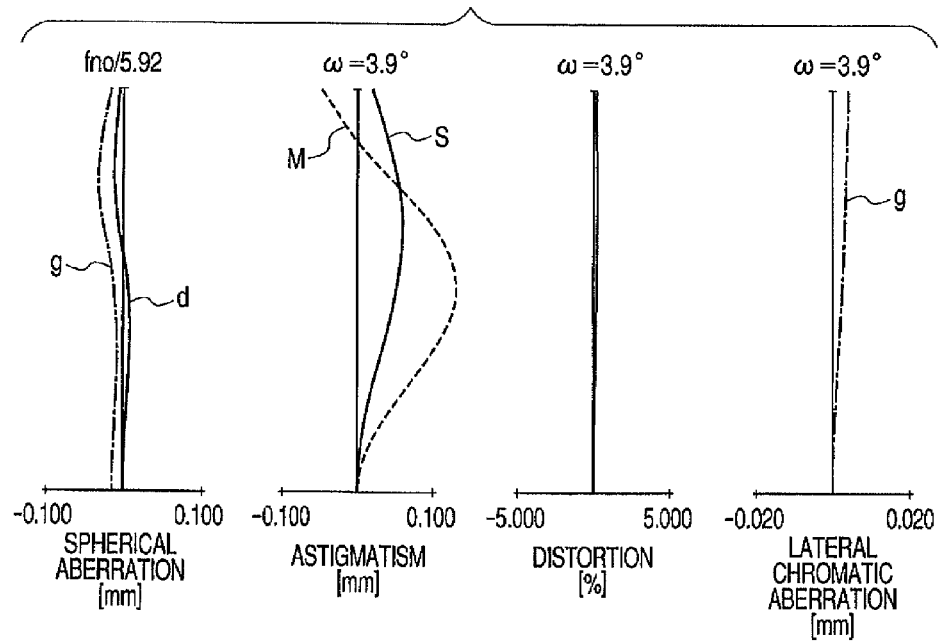
FIG. 16 is a diagram illustrating various aberrations of the zoom lens system of the fourth embodiment at a telephoto end.

FIG. 13 is a lens cross section of the zoom lens system according to a fourth embodiment of the present invention at the wide-angle end. FIGS. 14, 15 and 16 are diagrams illustrating various aberrations of the zoom lens system of the fourth embodiment at the wide-angle end, at the middle zoom position, and at the telephoto end, respectively.

Figure 17:
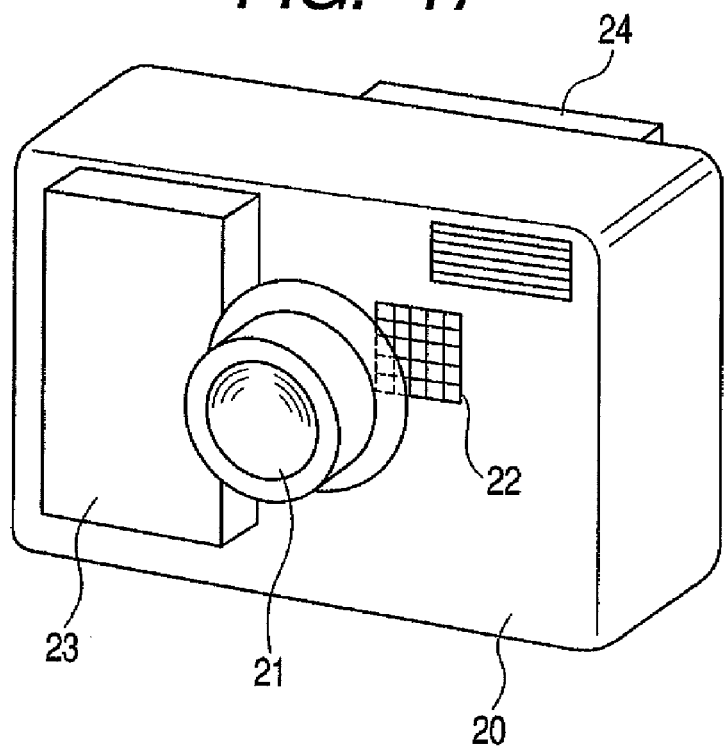
FIG. 17 is a schematic view of a main part of a camera according to the present invention.
Figure 18:
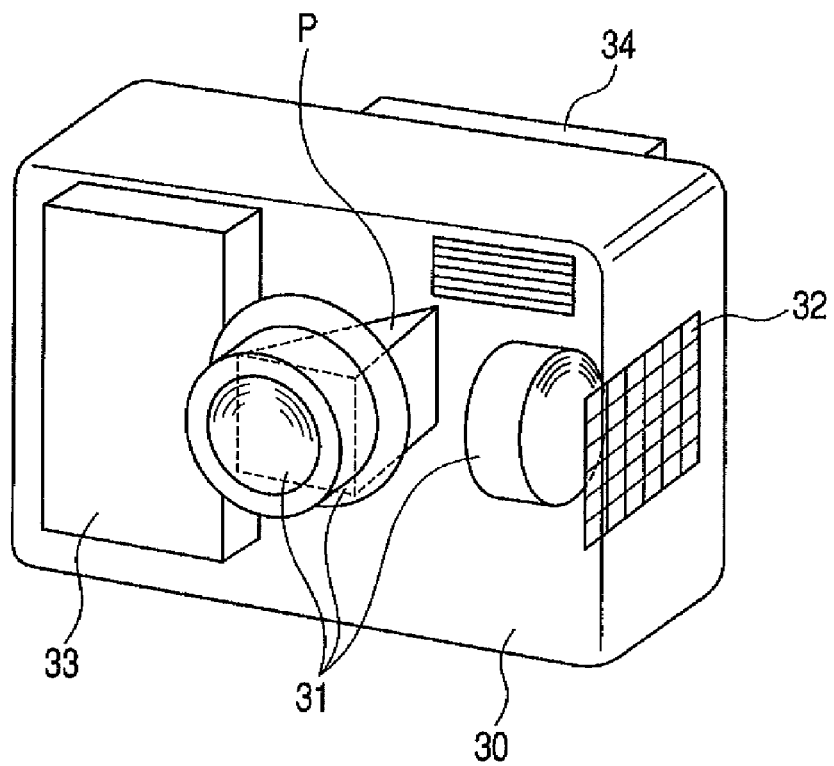
FIG. 18 is another schematic view of the main part of the camera according to the present invention.

FIGS. 17 and 18 are schematic views illustrating main parts of cameras including the zoom lens system according to the present invention.

The zoom lens system according to each of the embodiments is an imaging lens system used for a camera such as a video camera, a digital camera, or the like.

Further, when the zoom lens system of each embodiment is used as a projection lens element such as a projector, the left side corresponds to a screen while the right side corresponds to a projected image.

In each of the embodiments, a first lens unit L1 has a positive refractive power, and a second lens unit L2 has a negative refractive power. A rear unit LR includes at least one lens unit.

In the first embodiment of FIG. 1 and the third embodiment of FIG. 9, the rear unit LR includes a third lens unit L3 having a positive refractive power and a fourth lens unit L4 having a positive refractive power.

In the second embodiment of FIG. 5 and the fourth embodiment of FIG. 13, the rear unit LR includes a third lens unit L3 having a negative refractive power, a fourth lens unit L4 having a positive refractive power, and a fifth lens unit L5 having a positive refractive power.

An aperture stop SP is provided. In the zoom lens system according to the first embodiment of FIG. 1 and the third embodiment of FIG. 9, the aperture stop SP is provided on the object side of the third lens unit L3.

In the zoom lens system according to the second embodiment of FIG. 5 and the fourth embodiment of FIG. 13, the aperture stop SP is provided on the object side of the fourth lens unit L4.

In FIG. 1, a flare-cut stop FP is disposed on the image side of the third lens unit L3.

An optical block G corresponds to an optical filter, a face plate, a quartz low-pass filter, or an infrared cut filter.

At an image plane IP, an imaging plane of a solid-state image pickup element (photoelectric transducer) such as a CCD sensor or a CMOS sensor is disposed thereof when the zoom lens system according to the present invention is used as an image pickup optical system of a video camera or a digital still camera.

In addition, when the zoom lens system is used as an imaging optical system of a silver-halide film camera, the image plane IP corresponds to a film surface.

In the aberration charts, a d-line and a g-line are denoted by reference symbols d and g, respectively, and a meridional image plane and a sagittal image plane are denoted by reference symbols M and S, respectively. A lateral chromatic aberration (chromatic aberration of magnification) is expressed for a g-line. A half field angle is denoted by reference symbol ω and an f-number is denoted by reference symbol fno.

Further, in each embodiment described below, the wide-angle end and the telephoto end respectively mean the zoom positions when the lens unit for the magnification is located on both ends of a mechanical movable range on an optical axis.

An arrow shown in the drawings illustrating the lens cross section indicates a moving locus of each lens unit in the zooming from the wide-angle end to the telephoto end or a moving direction in the focusing.

In the positive-lead zoom lens system of each embodiment, the first lens unit L1 has an increased effective lens diameter. Therefore, in order to achieve a small size of the entire system, it is preferable for the first lens unit L1 to have a minimum number of lens elements.

Therefore, in each embodiment, the first lens unit L1 is adapted to have a composite optical element in which a first optical element (matrix) having a positive refractive power made of a ceramic material for example and at least one second optical element (replica) with a negative refractive power made of a resin material for example are cemented.

Further, when a refractive index and an Abbe number of the material of the first optical element are denoted by $n_{d1p}$ and $\nu_{d1p}$, and a refractive index and an Abbe number of the material of the second optical element are denoted by $n_{d1n}$ and $\nu_{d1n}$, the following conditions are satisfied.

$$2.45 < n_{d1p} - (9.3 \times 10^{-5} \times v_{d1p}^2 - 1.7 \times 10^{-2} \times v_{d1p}) < 3.00 \quad (1)$$

$$5.0 < v_{d1p} < 80.0 \quad (2)$$

$$1.35 < n_{d1n} < 2.35 \quad (3)$$

$$5.0 < v_{d1n} < 45.0 \quad (4)$$

Here, the refractive index of the material is a refractive index (nd) with respect to the d-line, and the Abbe number is an Abbe number (vd) of the material on the basis of the d-line expressed by the equation below.

$$vd = (Nd-1)/(NF-NC)$$

Here, Nd denotes a refractive index with respect to the d-line (having a wavelength of 587.6 nm), NF denotes a refractive index with respect to an F-line (having a wavelength of 486.1 nm), and NC denotes a refractive index with respect to a C-line (having a wavelength of 656.3 nm).

Next, technical meaning of each embodiment shown in the conditional expressions (1) to (4) is described.

The conditional expressions (1) and (2) define the refractive index and the Abbe number of a solid material to be used for the first optical element having a positive refractive power constituting the composite optical element of the first lens unit L1, so as to achieve a thin profile of the first optical element.

If $n_{d1p} - (9.3 \times 10^{-5} \times v_{d1p}^2 - 1.7 \times 10^{-2} \times v_{d1p})$ is greater than the upper limit value of the conditional expression (1) or $v_{d1p}$ is greater than the upper limit value of the conditional expression (2), there is little material that is optically practical, and hence it becomes difficult to use and embody the material for the optical system.

If $n_{d1p} - (9.3 \times 10^{-5} \times v_{d1p}^2 - 1.7 \times 10^{-2} \times v_{d1p})$ is smaller than the lower limit value of the conditional expression (1), the material to be used has a low refractive index, and hence it is necessary to decrease a curvature radius of the lens surface for maintaining the power of the first optical element. As a result, a thickness of the first optical element increases to be inappropriate. In addition, if $v_{d1p}$ is smaller than the lower limit value of the conditional expression (2), compensation for the aberrations becomes insufficient. In particular, it becomes difficult to compensate for longitudinal chromatic aberration (axial chromatic aberration) and lateral chromatic aberration over the entire zoom range with a good balance, which is not appropriate. Here, as a material of the first optical element, a translucent ceramic material can be used.

The conditional expressions (3) and (4) define the refractive index and the Abbe number of the material of the at least one second optical element having a negative refractive power that is cemented to the optical element having a positive refractive power of the first lens unit L1. Here, as a material of the second optical element, a resin material can be used for example.

The second optical element made of the material satisfying the conditional expressions (3) and (4) is disposed in the first lens unit L1, whereby the longitudinal chromatic aberration and the lateral chromatic aberration can be compensated with a good balance.

If $n_{d1n}$ is smaller than the lower limit value of the conditional expression (3), a thickness of the second optical element at the periphery increases so that the total lens length is increased. On the contrary, if $n_{d1n}$ is larger than the upper limit value, there is little material that is optically practical, and hence it becomes difficult to embody the material for the optical system.

IF $v_{d1n}$ is larger than the upper limit value or smaller than the lower limit value of the conditional expression (4), compensation for the aberrations becomes insufficient. In particular, it becomes difficult to compensate for longitudinal chromatic aberration and lateral chromatic aberration over the entire zoom range with a good balance, which is not appropriate.

Further, more preferably, the numerical ranges of the conditional expressions (1) to (4) should be set as follows.

$$2.45 < n_{d1p} - (9.3 \times 10^{-5} \times v_{d1p}^2 - 1.7 \times 10^{-2} \times v_{d1p}) < 2.80 \quad (1a)$$

$$10.0 < v_{d1p} < 75.0 \quad (2a)$$

$$1.45 < n_{d1n} < 2.00 \quad (3a)$$

$$10.0 < v_{d1n} < 35.0 \quad (4a)$$

The lens structure of the first lens unit L1 is appropriately set as described above, whereby it is possible to obtain the zoom lens system having a small diameter of the front lens and good optical performance over the entire zoom range from the wide-angle end to the telephoto end.

Further, in each embodiment, it is preferable that at least one of the following conditions should be satisfied. Thus, it is possible to obtain the effect corresponding to each condition.

Equation 1

$$0.2 < \frac{f_{1p}}{f_1} < 3.0 \quad (5)$$

$$1.0 < \left|\frac{f_{1n}}{f_1}\right| < 6.0 \quad (6)$$

$$50 < \left|\frac{v_{d1n} \times f_{1n}}{\sqrt{f_w \times f_t}}\right| < 500 \quad (7)$$

$$1.5 < \frac{f_1}{\sqrt{f_w \times f_t}} < 6.0 \quad (8)$$

$$0.2 < \left|\frac{f_{12t}}{f_t}\right| < 2.0 \quad (9)$$

$$5.0 < \frac{d_{1p}}{d_{1n}} < 60.0 \quad (10)$$

Here, $f_{1p}$ denotes a focal length of the first optical element in air, $f_1$ denotes a focal length of the first lens unit L1, $f_{1n}$ denotes a focal length of the second optical element in air, $f_w$, denotes a focal length of the entire zoom lens system at the wide-angle end, $f_t$ denotes a focal length of the entire zoom lens system at the telephoto end, $f_{12t}$ denotes a composite focal length of the first lens unit L1 and the second lens unit L2 at the telephoto end, $d_{1p}$ denotes a center thickness of the first optical element (thickness on the optical axis), and $d_{1n}$ denotes a center thickness of the second optical element. Further, as to $d_{1n}$, if multiple second optical elements are cemented to the first optical element, $d_{1n}$ indicates a total sum of the center thicknesses of the multiple second optical elements.

The conditional expression (5) is related to the refractive power of the first optical element.

If $f_{1p}/f_1$, is smaller than the lower limit value of the conditional expression (5) so that the refractive power of the first optical element is enhanced, a Petzval sum becomes too large in positive so that it becomes difficult to compensate for the field curvature.

On the contrary, if $f_{1p}/f_1$ is greater than the upper limit value so that the refractive power of the first optical element is weakened, the total lens length becomes long so that the diameter of the front lens is increased inappropriately.

More preferably, the numerical range of the conditional expression (5) should be set as below.

Equation 2

$$0.4 < \frac{f_{1p}}{f_1} < 2.5 \quad (5a)$$

The conditional expression (6) is related to the refractive power of the second optical element.

If $|f_{1n}/f_1|$ is smaller than the lower limit value of the conditional expression (6), the refractive power of the second optical element is enhanced, which makes it difficult to compensate for lateral chromatic aberration at the wide-angle end.

On the contrary, if $|f_{1n}/f_1|$ is greater than the upper limit value, the refractive power becomes too weak, whereby compensation for the chromatic aberration becomes insufficient at the telephoto end.

More preferably, the numerical range of the conditional expression (6) should be set as below.

Equation 3

$$1.2 < \left|\frac{f_{1n}}{f_1}\right| < 5.5 \quad (6a)$$

The conditional expression (7) is related to the refractive power and the Abbe number of the second optical element.

If $|v_{d1n} \times f_{1n}/(f_w \times f_t)^{1/2}|$ is smaller than the lower limit value of the conditional expression (7) so that the negative refractive power of the second optical element is enhanced, it becomes difficult to compensate for lateral chromatic aberration at the wide-angle end.

On the contrary, if $|v_{d1n} \times f_{1n}/(f_w \times f_t)^{1/2}|$ is greater than the upper limit value so that the refractive power becomes too weak, compensation for the chromatic aberration becomes insufficient at the telephoto end.

More preferably, the numeric range of the conditional expression (7) should be set as below.

Equation 4

$$70 < \left|\frac{v_{d1n} \times f_{1n}}{\sqrt{f_w \times f_t}}\right| < 400 \quad (7a)$$

The conditional expression (8) is related to the focal length of the first lens unit L1.

If $f_1/(f_w \times f_t)^{1/2}$ is smaller than the lower limit value of the conditional expression (8) so that the positive refractive power of the first lens unit L1 is enhanced, it becomes difficult to compensate for the axial color aberration at the telephoto end. In addition, the Petzval sum becomes too large in positive so that compensation for the field curvature becomes difficult.

On the contrary, if $f_1/(f_w \times f_t)^{1/2}$ is greater than the upper limit value so that the positive refractive power of the first lens unit L1 is weakened, the total lens length becomes long, and the diameter of the front lens is increased inappropriately.

Further, more preferably, the numerical range of the conditional expression (8) should be set as follows.

Equation 5

$$1.8 < \frac{f_1}{\sqrt{f_w \times f_t}} < 5.5 \quad (8a)$$

The conditional expression (9) is related to the composite focal length of the first lens unit L1 and the second lens unit L2 at the telephoto end.

If $|f_{12t}/f_t|$ is smaller than the lower limit of the conditional expression (9) so that the composite refractive power of the first lens unit L1 and the second lens unit L2 is enhanced, it becomes difficult to compensate for aberrations such as spherical aberration. In addition, sensitivity that is a ratio of the imaging position to a variation of the refractive power of the lens unit is increased so that the manufacturing becomes difficult.

On the contrary, if $|f_{12t}/f_t|$ is greater than the upper limit so that the composite refractive power of the first lens unit L1 and the second lens unit L2 is weakened, movement amounts of the first lens unit L1 and the second lens unit L2 are increased when the zooming is performed so that the entire lens length is increased inappropriately.

More preferably, the numerical range of the conditional expression (9) should be set as below.

Equation 6

$$0.4 < \left|\frac{f_{12t}}{f_t}\right| < 1.8 \quad (9a)$$

The conditional expression (10) is related to a ratio of the center thickness $d_{1p}$ of the first optical element to the center thickness $d_{1n}$ of the second optical element.

If $d_{1p}/d_{1n}$ is smaller than the lower limit of the conditional expression (10), an edge thickness of the first optical element having a positive refractive power is reduced, and the lens shape becomes difficult to manufacture for maintaining appropriate lightness. Otherwise, the center thickness on the side of the second optical element having a negative refractive power is increased, and the entire lens length is increased.

On the contrary, if $d_{1p}/d_{1n}$ is greater than the upper limit, the center thickness on the side of the second optical element having a negative refractive power is reduced, and the lens shape becomes difficult to manufacture. Otherwise, the center thickness on the side of the first optical element having a positive refractive power is increased, and the entire lens length is increased inappropriately.

Further, more preferably, the numerical range of the conditional expression (10) should be set as follows.

Equation 7

$$10.0 < \frac{d_{1p}}{d_{1n}} < 55.0 \quad (10a)$$

If at least one of the conditional expressions described above is satisfied, it is possible to obtain the zoom lens system easily that has good optical performance over the entire zoom range from the wide-angle end to the telephoto end.

Further, in each embodiment, another lens unit such as a converter lens element may be disposed on the object side of the first lens unit L1 or the image side of the lens unit that is closest to the image side, or on each side thereof.

In the zoom lens system according to the present invention, the number of the lens units constituting the rear unit LR is arbitrary, and it is sufficient if at least one lens unit is disposed.

The zoom lens system according to the present invention has three or more lens units, and two lens units move for zooming in the zoom lens system.

Next, the lens structure of the zoom lens system of each embodiment according to the present invention is described.

The zoom lens system of the first embodiment includes the first lens unit L1 having a positive refractive power, the second lens unit L2 having a negative refractive power, the third lens unit L3 having a positive refractive power, and the fourth lens unit L4 having a positive refractive power, which are disposed in the stated order from the object side to the image side.

Further, when the zooming is performed from the wide-angle end to the telephoto end, each lens unit moves for zooming so that a distance between the lens units is changed.

Specifically, when the zooming is performed from the wide-angle end to the telephoto end, the first lens unit L1 is moved to the image side as illustrated by the arrow and then is moved to the object side. In other words, the first lens unit L1 is moved so as to draw a locus convex to the image side.

The second lens unit L2 is moved so as to draw a locus convex to the image side, and thus the image plane variation accompanying the magnification is compensated.

In addition, the third lens unit L3 and the fourth lens unit L4 are moved to the object side.

When the zooming is performed, the first lens unit L1 and the third lens unit L3 are moved so as to be positioned more closely to the object side at the telephoto end than at the wide-angle end. Thus, the total lens length at the wide-angle end can be maintained to be small, while a large zoom ratio can be obtained.

In addition, a rear focus type is adopted in which the fourth lens unit L4 is moved on the optical axis for focusing.

When focusing from an infinite object to an object in close proximity at the telephoto end, the fourth lens unit L4 is moved forward as illustrated in FIG. 1 by an arrow 4c.

A solid curved line 4a and a broken curved line 4b of the fourth lens unit L4 respectively indicate moving loci for compensating for the image plane variation accompanying the zooming from the wide-angle end to the telephoto end when an infinite object or an object in close proximity is in focus, respectively.

The first optical element G11 having a positive refractive power constitutes the first lens unit L1, and is made of a ceramic material. The second optical element G12 having a negative refractive power constitutes the first lens unit L1, and is made of a resin material and is cemented to the first optical element G11. The first optical element G11 and the second optical element G12 are cemented to each other so as to constitute the composite optical element.

Note that the second optical element G12 is laminated on the surface of the first optical element G11.

In this embodiment, the composite optical element includes the first optical element and the second optical element G12 (that can be two or more) cemented to the first optical element G11. The first optical element (lens element main body that is preferably made of ceramic or glass) G11 and the second optical element (auxiliary lens element that is preferably made of resin) G12 cemented to the first optical element satisfy the following relationships.

(a) The thickness of the first optical element on the optical axis is larger than or equal to three times (preferably, five times) the thickness of the second optical element on the optical axis. Here, the thickness of the first optical element on the optical axis is preferably smaller than or equal to 100 times the thickness of the second optical element on the optical axis.

(b) The absolute value of the refractive power (inverse number of the focal length) of the first optical element is larger than or equal to two times (preferably, 2.5 times) the absolute value of the refractive power of the second optical element. Here, the absolute value of the refractive power (inverse number of the focal length) of the first optical element is smaller than or equal to 50 times (preferably, 40 times) the absolute value of the refractive power of the second optical element.

The zoom lens system of the second embodiment includes the first lens unit L1 having a positive refractive power, the second lens unit L2 having a negative refractive power, the third lens unit L3 having a negative refractive power, the fourth lens unit L4 having a positive refractive power, and the fifth lens unit L5 having a positive refractive power, which are disposed in the stated order from the object side to the image side.

Further, when the zooming is performed from the wide-angle end to the telephoto end, the first, the third, the fourth and the fifth lens units are moved for zooming so that the respective intervals between the lens units are changed.

Specifically, when the zooming is performed from the wide-angle end to the telephoto end, the first lens unit L1 moves to the object side. The second lens unit L2 does not move. The third lens unit L3 moves to the image side and then moves to the object side in a reciprocating manner. The fourth lens unit L4 moves to the object side. The fifth lens unit L5 moves to the image side.

Further, a prism P includes a reflection surface for bending the optical path, and constitutes a part of the second lens unit L2. In addition, a solid curved line 5a and a broken curved line 5b that are related to the fifth lens unit L5 respectively indicate moving loci for compensating for an image plane variation accompanying the magnification from the wide-angle end to the telephoto end when an infinite object and an object in close proximity are respectively in focus.

When focusing from an infinite object to an object in close proximity at the telephoto end, the fifth lens unit L5 is moved forward as illustrated in FIG. 5 by an arrow 5c.

The first optical element G11 having a positive refractive power constitutes the first lens unit L1, and is made of a ceramic material. The second optical element G12 having a negative refractive power constitutes the first lens unit L1, is made of a resin material, and is cemented to the first optical element G11. The first optical element G11 and the second optical element G12 are cemented to each other so as to constitute the composite optical element.

Note that the second optical element G12 is laminated on the surface of the first optical element G11.

The zoom lens system of the third embodiment includes the first lens unit L1 having a positive refractive power, the second lens unit L2 having a negative refractive power, the third lens unit L3 having a positive refractive power, and the fourth lens unit L4 having a positive refractive power, which are disposed in the stated order from the object side to the image side.

Further, when the zooming is performed from the wide-angle end to the telephoto end, each of the lens units is moved for zooming so that the respective intervals between the lens units are changed.

Specifically, when the zooming is performed from the wide-angle end to the telephoto end, the first lens unit L1 moves to the object side. The second lens unit L2 moves to the object side. The third lens unit L3 moves to the object side. The fourth lens unit L4 moves to the object side.

In addition, rear focus type is adopted in which the second lens unit L2 is moved on the optical axis for focusing. A solid curved line 2a and a broken curved line 2b of the second lens unit L2 respectively indicate moving loci for compensating for the image plane variation accompanying the zooming from the wide-angle end to the telephoto end when an infinite object and an object in close proximity are respectively in focus.

For instance, when focusing from an infinite object to an object in close proximity at the zoom position of the telephoto end, the second lens unit L2 is moved forward as illustrated by an arrow 2c.

The first optical element G11 having a positive refractive power constitutes the first lens unit L1, and is made of a ceramic material. The second optical element G12 having a negative refractive power constitutes the first lens unit L1, is made of a resin material, and is cemented to the first optical element G11. The first optical element G11 and the second optical element G12 are cemented to each other so as to constitute the composite optical element.

A third optical element G13 having a positive refractive power constitutes the first lens unit L1 and is made of a ceramic material similarly to the first optical element G11.

Note that the second optical element G12 is laminated on the surface of the first optical element G11.

The lens structure of the zoom lens system of the fourth embodiment is the same as that of the second embodiment.

Further, when zooming from the wide-angle end to the telephoto end, the first, the third, the fourth and the fifth lens units are moved for zooming so that the respective intervals between the lens units are changed.

Specifically, when zooming from the wide-angle end to the telephoto end, the first to fifth lens units are moved (or are not moved) as follows. The first lens unit L1 moves to the image side and then moves to the object side in a reciprocating manner. The second lens unit L2 does not move for zooming (when the zooming is performed). The third lens unit L3 moves to the image side and then moves to the object side in a reciprocating manner (along the locus convex to the image side). The fourth lens unit L4 moves to the object side. The fifth lens unit L5 moves so as to draw a locus convex to the image side (along the locus convex to the image side). In addition, similar to the second embodiment, the second lens unit L2 has the prism P including the reflection surface for bending the optical path.

The focusing is performed by the fifth lens unit L5, which moves for focusing in the same manner as the second embodiment.

The first optical element G11 having a positive refractive power constitutes the first lens unit L1, and is made of a ceramic material. The second optical element A G12 having a negative refractive power constitutes the first lens unit L1, is made of a resin material and is cemented to the first optical element G11. The first optical element G11 and the second optical element A G12 are cemented to each other so as to constitute the composite optical element.

The second optical element B G13 having a negative refractive power constitutes the first lens unit L1. Further, the second optical element B G13 is made of a resin material similarly to the second optical element A G12 and is cemented to the image-side surface of the first optical element G11. The first to second optical elements G11 to G13 constitute the composite optical element.

Further, in each embodiment, the surface of at least one optical element having a negative refractive power, which contacts with air, has an aspherical surface shape.

The aperture stop SP moves together with the third lens unit L3 for zooming in the first and third embodiments, but may move separately or may be fixed. If the aperture stop SP moves together with the third lens unit L3, the number of moving units can be decreased so that a mechanical structure can be simplified easily.

The aperture stop SP moves together with the fourth lens unit L4 for zooming in the second and fourth embodiments, but may move separately or may be fixed. If the aperture stop SP moves together with the fourth lens unit L4, the number of moving units can be decreased so that the mechanical structure can be simplified easily.

Next, first to fourth numerical embodiments respectively corresponding to the first to fourth embodiments of the present invention are described. In the respective numerical embodiments, an optical surface's order counted from the object side is denoted by "i", a curvature radius of an i-th optical surface (i-th surface) is denoted by ri, and an interval between the i-th surface and an (i+1)-th surface is denoted by di. In addition, a refractive index of a material of the i-th optical member based on the d-line is denoted by ndi and an Abbe number thereof based on the d-line is denoted by νdi.

Assume that a conic constant is expressed by k, aspherical coefficients are expressed by B, C, D, and E, and a displacement with respect to a surface vertex in the optical axis direction at a position corresponding to a height h from the optical axis is expressed by x. In this case, the aspherical shape is expressed as follows. Note that a curvature radius is denoted by R.

Equation 8

$$x = \frac{h^2/R}{1+\sqrt{1-(1+k)(h/R)^2}} + Bh^4 + Ch^6 + Dh^8 + Eh^{10}$$

In addition, for example, "e-Z" indicates "$10^{-Z}$". f represents the focal length, Fno represents the f-number, and ω represents the half field angle.

In the first, second, and fourth numerical embodiments, four last surfaces on the image side are surfaces which form an optical block.

Table 1 illustrates relationships between the above-mentioned conditional expressions and various numerical values in the respective numerical embodiments.

First Numerical Embodiment

| | f = 5.59 to 14.22 to 30.18 Fno = 2.89 to 4.21 to 5.89 2ω = 70.49° to 31.05° to 14.91° | | | | |
|---|---|---|---|---|---|
| Surface number | r | d | nd | vd | Effective diameter |
| 1 | 125.217 | 2.42 | 1.82750 | 51.5 | 19.89 |
| 2 | −44.785 | 0.10 | 1.62524 | 25.2 | 19.33 |
| 3* | −131.025 | (Variable) | | | 18.76 |
| 4* | −4374.260 | 0.80 | 1.97500 | 39.5 | 14.18 |
| 5* | 6.723 | 1.92 | | | 11.50 |
| 6* | 11.042 | 1.93 | 2.14353 | 17.8 | 11.66 |
| 7* | 19.550 | (Variable) | | | 11.39 |
| 8 (Stop) | ∞ | 0.60 | | | 5.21 |
| 9* | 6.088 | 1.74 | 1.60300 | 65.4 | 5.37 |
| 10* | −37.905 | 0.10 | | | 5.11 |
| 11 | 5.050 | 1.03 | 1.49700 | 81.5 | 5.05 |
| 12 | 7.289 | 0.50 | 1.80518 | 25.4 | 4.74 |
| 13 | 3.659 | 0.87 | | | 4.37 |
| 14 | ∞ | (Variable) | | | 4.43 |
| 15* | 12.524 | 1.60 | 1.75500 | 71.5 | 9.66 |
| 16* | 41.812 | (Variable) | | | 9.62 |
| 17 | ∞ | 0.60 | 1.51633 | 64.1 | 8.42 |
| 18 | ∞ | 0.90 | | | 8.33 |
| 19 | ∞ | 0.40 | 1.51633 | 64.1 | 8.12 |
| 20 | ∞ | | | | 8.08 |

Aspherical coefficient

3rd surface

K = −2.57862e+001   A = 8.92397e−007   B = −3.59355e−008   C = 2.24120e−010   D = 1.59301e−014

4th surface

K = −4.38949e+005   A = 5.04189e−005   B = −1.40263e−006   C = 9.10798e−010   D = −9.40047e−012

5th surface

K = −5.88638e−002   A = −3.10606e−004   B = 4.32625e−006   C = 8.70835e−008   D = −8.91268e−009

6th surface

K = −7.30420e−001   A = −3.69138e−004   B = 5.12918e−006   C = 5.43993e−008   D = −2.46468e−009

7th surface

K = −1.68898e+000   A = −3.60528e−004   B = 1.04839e−006   C = 5.52864e−008   D = −1.81285e−009

9th surface

K = 2.78651e−001   A = −5.44811e−004   B = −1.62341e−005   C = −8.74172e−007   D = −6.47382e−008

10th surface

K = −4.84672e+001   A = 1.23662e−005   B = −8.98014e−006   C = −4.33506e−007   D = −6.77911e−008

15th surface

K = −7.40304e+000   A = −3.20456e−004   B = −3.99343e−006   C = 2.34280e−008   D = 9.93317e−009

16th surface

K = −3.20274e+001   A = −8.83431e−004   B = 4.43177e−006   C = 1.38524e−007   D = 5.30069e−009

| | Focal length | | |
|---|---|---|---|
| Variable interval | 5.59 | 14.22 | 30.18 |
| d3 | 1.05 | 10.88 | 17.86 |
| d7 | 21.01 | 6.54 | 1.16 |
| d14 | 7.01 | 10.57 | 21.16 |
| d16 | 1.36 | 3.96 | 5.16 |

Second Numerical Embodiment

| | f = 6.20 to 11.87 to 52.01 Fno = 2.86 to 4.24 to 5.92 2ω = 59.87° to 33.48° to 7.85° | | | | |
|---|---|---|---|---|---|
| Surface number | r | d | nd | vd | Effective diameter |
| 1* | 33.406 | 0.10 | 1.62524 | 25.2 | 23.20 |
| 2 | 19.497 | 4.26 | 1.83520 | 53.0 | 21.94 |
| 3 | 109.277 | (Variable) | | | 20.60 |
| 4 | 44.993 | 0.95 | 1.82750 | 51.5 | 17.77 |
| 5 | 8.740 | 4.00 | | | 13.68 |
| 6 | ∞ | 11.50 | 2.00330 | 28.3 | 13.38 |
| 7 | ∞ | (Variable) | | | 10.91 |
| 8* | −25.448 | 1.35 | 1.56732 | 42.8 | 9.58 |
| 9 | 13.094 | 0.41 | | | 9.15 |
| 10 | 16.345 | 1.48 | 1.92286 | 18.9 | 9.19 |
| 11 | 61.229 | (Variable) | | | 8.99 |
| 12 (Stop) | ∞ | 0.65 | | | 6.83 |
| 13* | 10.883 | 2.09 | 1.48749 | 70.2 | 7.04 |
| 14 | −31.344 | 0.10 | | | 6.92 |
| 15 | 6.228 | 3.17 | 1.48749 | 70.2 | 6.61 |
| 16 | 11.707 | 0.60 | 2.00330 | 28.3 | 5.45 |
| 17 | 5.148 | 2.35 | | | 5.10 |
| 18 | 9.889 | 1.26 | 1.48749 | 70.2 | 6.04 |
| 19 | 54.982 | (Variable) | | | 6.12 |
| 20* | 29.723 | 2.08 | 1.48749 | 70.2 | 8.40 |
| 21 | −23.965 | (Variable) | | | 8.36 |
| 22 | ∞ | 0.60 | 1.51633 | 64.1 | 7.56 |
| 23 | ∞ | 0.90 | | | 7.47 |
| 24 | ∞ | 0.40 | 1.51633 | 64.1 | 7.28 |
| 25 | ∞ | | | | 7.23 |

Aspherical coefficient

1st surface

K = 1.47318e−003  A = −2.76172e−006  B = 1.65539e−008  C = −2.04516e−010  D = 7.68381e−013

8th surface

K = −6.65199e+000  A = 5.51647e−005  B = 3.24022e−006  C = −1.86697e−007  D = 3.36903e−009

13th surface

K = 1.49601e+000  A = −2.91442e−004  B = −2.01215e−006  C = −7.61092e−008  D = 1.12157e−009

20th surface

K = −2.30773e+001  A = −2.61671e−005  B = 4.44146e−006  C = 6.09860e−008  D = −6.83702e−009

| | Focal length | | |
|---|---|---|---|
| Variable interval | 6.20 | 11.87 | 52.01 |
| d3 | 0.60 | 3.57 | 19.47 |
| d7 | 3.42 | 4.77 | 0.90 |
| d11 | 18.45 | 8.99 | 1.07 |
| d19 | 5.81 | 15.13 | 27.82 |
| d21 | 5.58 | 4.37 | 3.47 |

Third Numerical Embodiment

| | f = 17.50 to 29.50 to 48.00 Fno = 2.88 to 2.88 to 2.88 2ω = 79.29° to 52.35° to 33.62° | | | | |
|---|---|---|---|---|---|
| Surface number | r | d | nd | vd | Effective diameter |
| 1* | 167.626 | 0.10 | 1.69770 | 20.1 | 52.14 |
| 2 | 98.401 | 4.00 | 1.75500 | 71.5 | 50.81 |
| 3 | 1062.815 | 0.20 | | | 50.05 |
| 4 | 48.518 | 5.50 | 1.75500 | 71.5 | 45.36 |
| 5 | 99.861 | (Variable) | | | 43.26 |

-continued

| | | f = 17.50 to 29.50 to 48.00 Fno = 2.88 to 2.88 to 2.88 2ω = 79.29° to 52.35° to 33.62° | | | |
|---|---|---|---|---|---|
| 6* | 155.814 | 0.20 | 1.52421 | 51.4 | 25.01 |
| 7 | 80.988 | 1.20 | 1.78590 | 44.2 | 24.83 |
| 8 | 12.294 | 5.80 | | | 18.01 |
| 9 | −29.561 | 1.00 | 1.80400 | 46.6 | 17.23 |
| 10 | 49.465 | 0.50 | | | 16.38 |
| 11 | 33.375 | 4.10 | 1.75520 | 27.5 | 16.17 |
| 12 | −33.900 | 1.40 | | | 15.38 |
| 13 | −18.309 | 1.00 | 1.83481 | 42.7 | 15.11 |
| 14 | 608.453 | 3.00 | 1.75520 | 27.5 | 16.66 |
| 15 | −37.722 | (Variable) | | | 17.79 |
| 16 (Stop) | ∞ | 1.00 | | | 19.20 |
| 17 | 34.558 | 5.00 | 1.52249 | 59.8 | 21.05 |
| 18 | −31.388 | 0.20 | | | 21.34 |
| 19 | 28.621 | 3.60 | 1.48749 | 70.2 | 21.02 |
| 20 | 114.170 | 2.80 | | | 20.39 |
| 21 | −26.157 | 1.00 | 1.83400 | 37.2 | 20.29 |
| 22 | −202.899 | (Variable) | | | 20.81 |
| 23 | 154.631 | 3.20 | 1.48749 | 70.2 | 21.30 |
| 24 | −79.415 | 0.30 | 1.52421 | 51.4 | 21.57 |
| 25* | −76.020 | 2.50 | | | 21.67 |
| 26 | −68.926 | 3.20 | 1.48749 | 70.2 | 22.09 |
| 27 | −23.943 | 0.20 | | | 22.41 |
| 28 | −73.900 | 1.00 | 1.83400 | 37.2 | 22.15 |
| 29 | 42.207 | 5.80 | 1.49700 | 81.5 | 23.20 |
| 30 | −29.482 | 0.20 | | | 24.04 |
| 31 | −130.600 | 4.10 | 1.48749 | 70.2 | 24.80 |
| 32 | −36.179 | | | | 25.51 |

Aspherical coefficient

1st surface $K = -8.10395e+000$   $A = 4.12044e-007$   $B = -3.56056e-010$   $C = 1.84091e-013$   $D = 1.11807e-016$ 6th surface $K = -3.04232e+001$   $A = 3.47459e-005$   $B = -1.09054e-007$   $C = 3.15972e-010$   $D = -3.57830e-013$ 25th surface $K = -5.48186e+000$   $A = 3.27761e-005$   $B = -9.01837e-010$   $C = -2.25561e-010$   $D = 6.42190e-013$

| | Focal length | | |
|---|---|---|---|
| Variable interval | 17.50 | 29.50 | 48.00 |
| d5 | 2.76 | 10.49 | 23.12 |
| d15 | 13.11 | 4.54 | 0.81 |
| d22 | 6.39 | 2.84 | 1.22 |

Fourth Numerical Embodiment

| | | f = 6.20 to 11.97 to 52.05 Fno = 2.86 to 4.24 to 5.92 2ω = 59.87° to 33.21° to 7.85° | | | |
|---|---|---|---|---|---|
| Surface number | r | d | nd | vd | Effective diameter |
| 1* | 28.249 | 0.10 | 1.62524 | 25.2 | 22.07 |
| 2 | 19.560 | 3.71 | 1.83520 | 53.0 | 21.20 |
| 3 | 131.938 | 0.10 | 1.59696 | 29.4 | 20.03 |
| 4* | 62.390 | (Variable) | | | 19.12 |
| 5 | 47.005 | 0.95 | 1.81600 | 46.6 | 17.67 |
| 6 | 8.658 | 4.00 | | | 13.58 |
| 7 | ∞ | 11.50 | 2.00330 | 28.3 | 13.29 |
| 8 | ∞ | (Variable) | | | 10.93 |
| 9* | −25.030 | 1.35 | 1.56732 | 42.8 | 9.82 |
| 10 | 12.972 | 0.41 | | | 9.40 |
| 11 | 16.074 | 1.48 | 1.92286 | 18.9 | 9.45 |
| 12 | 60.477 | (Variable) | | | 9.26 |
| 13 | ∞ | 0.65 | | | 6.80 |

-continued f = 6.20 to 11.97 to 52.05 Fno = 2.86 to 4.24 to 5.92 2ω = 59.87° to 33.21° to 7.85°

| | | | | | |
|---|---|---|---|---|---|
| (Stop) | | | | | |
| 14* | 10.880 | 2.09 | 1.48749 | 70.2 | 7.01 |
| 15 | −28.952 | 0.10 | | | 6.89 |
| 16 | 6.168 | 3.17 | 1.48749 | 70.2 | 6.65 |
| 17 | 11.459 | 0.60 | 2.00330 | 28.3 | 5.75 |
| 18 | 5.134 | 2.35 | | | 5.36 |
| 19 | 10.468 | 1.26 | 1.48749 | 70.2 | 6.28 |
| 20 | 51.682 | (Variable) | | | 6.34 |
| 21* | 31.729 | 2.08 | 1.48749 | 70.2 | 8.32 |
| 22 | −22.791 | (Variable) | | | 8.30 |
| 23 | ∞ | 0.60 | 1.51633 | 64.1 | 7.51 |
| 24 | ∞ | 0.90 | | | 7.43 |
| 25 | ∞ | 0.40 | 1.51633 | 64.1 | 7.24 |
| 26 | ∞ | | | | 7.18 |

Aspherical coefficient

1st surface $K = 1.52213e+000$   $A = -6.96050e-007$   $B = 3.49690e-008$   $C = 1.55607e-010$   $D = -4.90068e-013$ 4th surface $K = 1.09115e+001$   $A = 9.68390e-006$   $B = 2.42334e-008$   $C = 8.44382e-010$   $D = -4.16289e-012$ 9th surface $K = -7.43571e+000$   $A = 4.79997e-005$   $B = 1.60149e-006$   $C = -4.58529e-008$   $D = 9.26837e-010$ 14th surface $K = 1.55204e+000$   $A = -3.12111e-004$   $B = -1.39192e-006$   $C = -1.51094e-007$   $D = 3.14050e-009$ 21st surface $K = 1.86927e+000$   $A = -1.60210e-004$   $B = 1.19015e-005$   $C = -5.29046e-007$   $D = 1.00131e-008$

| | Focal length | | |
|---|---|---|---|
| Variable interval | 6.20 | 11.94 | 52.00 |
| d4 | 0.70 | 1.33 | 19.76 |
| d8 | 3.07 | 3.28 | 0.93 |
| d12 | 18.38 | 8.83 | 1.11 |
| d20 | 5.41 | 16.37 | 26.99 |
| d22 | 5.55 | 3.93 | 3.39 |

TABLE 1

| | First embodiment | Second embodiment | Third embodiment | Fourth embodiment | |
|---|---|---|---|---|---|
| Conditional expression (1) | 2.46 | 2.47 | 2.50 | 2.47 | |
| Conditional expression (2) | 51.5 | 53 | 71.5 | 53 | |
| Conditional expression (3) | 1.62524 | 1.62524 | 1.6977 | 1.62524 | 1.59696 |
| Conditional expression (4) | 25.2 | 25.2 | 20.1 | 25.2 | 29.4 |
| Conditional expression (5) | 0.63 | 0.62 | 1.78 | 0.60 | |
| Conditional expression (6) | 1.72 | 1.68 | 4.24 | 2.28 | 4.42 |
| Conditional expression (7) | 211.2 | 105.4 | 237.0 | 143.4 | 324.8 |
| Conditional expression (8) | 4.87 | 2.49 | 2.78 | 2.50 | |

TABLE 1-continued

| | | | | |
|---|---|---|---|---|
| Conditional expression (9) | 0.71 | 1.39 | 0.53 | 1.38 |
| Conditional expression (10) | 24.2 | 42.6 | 40.0 | 18.6 |

Next, an embodiment of a digital still camera in which the zoom lens system described in the first or third embodiment is used as an imaging optical system is described with reference to FIG. 17.

In FIG. 17, the digital still camera includes a camera main body 20, a shooting optical system 21 constituted by any one of the zoom lens systems described in the first and third embodiments, and a solid-state image pickup element (photoelectric transducer) 22 such as a CCD sensor or a CMOS sensor, which is incorporated in the camera main body and receives light of a subject image formed by the shooting optical system 21.

The digital still camera further includes a memory 23 for recording information corresponding to the subject image converted in a photoelectric manner by the solid-state image pickup element 22, and a finder 24 which is constituted by a liquid crystal display panel or the like and is provided for observing the subject image formed on the solid-state image pickup element 22.

If the zoom lens system according to the present invention is applied to a camera such as the digital still camera in this way, a small camera having high optical performance can be realized.

Next, an embodiment of a digital camera (optical equipment) in which the zoom lens system of the second or fourth embodiment of the present invention is used as an imaging optical system is described with reference to FIG. 18.

In FIG. 18, the digital camera includes a digital camera main body 30, a shooting optical system 31 constituted by the zoom lens system of one of the embodiments described above, and a prism P. The subject image (photographed light) that has passed through the shooting optical system 31 is led onto an image pickup element 32 such as a CCD (onto a photoelectric transducer).

The digital camera further includes a recording unit 33 for recording the subject image received by the image pickup element 32, and a finder 34 for observing the subject image displayed on a display element (not shown).

The display element is constituted by a liquid crystal panel or the like, on which the subject image formed on the image pickup element 32 is displayed.

Thus, the zoom lens system according to the present invention is applied to the optical equipment such as the digital camera, and hence the small camera having high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-145621, filed Jun. 3, 2008, which is hereby incorporated by reference in its entirety.

What is claimed is:

1. A zoom lens system, comprising, in order from an object side to an image side:

a first lens unit having a positive optical power;
a second lens unit having a negative optical power; and
a rear unit including at least one lens unit,
wherein at least two of the first lens unit, the second lens unit, and the at least one lens unit of the rear unit move for zooming so that a distance between adjacent lens units is changed;
the first lens unit includes a composite optical element in which a first optical element having a positive optical power and a second optical element having a negative optical power are cemented to each other; and
the following conditions are satisfied:

$$2.45 < n_{d1p} - (9.3 \times 10^{-5} \times v_{d1p}^2 - 1.7 \times 10^{-2} \times v_{d1p}) < 3.00;$$

$$5.0 < v_{d1p} < 80.0;$$

$$1.35 < n_{d1n} < 2.35; \text{ and}$$

$$5.0 < v_{d1n} < 45.0,$$

where $n_{d1p}$ and $v_{d1p}$ denote a refractive index and an Abbe number of a material of the first optical element, respectively, and $n_{d1n}$ and $v_{d1n}$ denote a refractive index and an Abbe number of a material of the second optical element, respectively,
wherein the following condition is satisfied $$5.0 < \frac{d_{1p}}{d_{1n}} < 60.0$$

where $d_{1p}$ denotes a center thickness of the first optical element, and $d_{1n}$ denotes a center thickness of the second optical element.

2. A zoom lens system according to claim 1, wherein the following condition is satisfied $$0.2 < \frac{f_{1p}}{f_1} < 3.0$$

where $f_{1p}$ denotes a focal length of the first optical element in air, and $f_1$ denotes a focal length of the first lens unit.

3. A zoom lens system according to claim 1, wherein the following condition is satisfied $$1.0 < \left| \frac{f_{1n}}{f_1} \right| < 6.0$$

where $f_{1n}$ denotes a focal length of the second optical element in air, and $f_1$ denotes a focal length of the first lens unit.

4. A zoom lens system according to claim 1, wherein the following condition is satisfied $$50 < \left| \frac{v_{d1n} \times f_{1n}}{\sqrt{f_w \times f_t}} \right| < 500$$

where $f_w$ denotes a focal length of the zoom lens system at a wide-angle end, and $f_t$ denotes a focal length of the zoom lens system at a telephoto end,
wherein f1n denotes a focal length of the second optical element in air.

5. A zoom lens system according to claim 1, wherein the following condition is satisfied $$1.5 < \frac{f_1}{\sqrt{f_w \times f_t}} < 6.0$$

where $f_1$ denotes a focal length of the first lens unit, $f_w$ denotes a focal length of the zoom lens system at a wide-angle end, and $f_t$ denotes a focal length of the zoom lens system at a telephoto end.

6. A zoom lens system according to claim 1, wherein the following condition is satisfied $$0.2 < \left| \frac{f_{12t}}{f_t} \right| < 2.0$$

where $f_{12t}$ denotes a composite focal length of the first lens unit and the second lens unit at a telephoto end, and $f_t$ denotes a focal length of the zoom lens system at the telephoto end.

7. A zoom lens system according to claim 1, wherein the second optical element includes a surface formed in aspherical shape contacting with air.

8. A camera, comprising:
the zoom lens system according to claim 1; and
a solid-state image pickup element for receiving light of an image formed by the zoom lens system.

* * * * *